United States Patent
Ko et al.

(10) Patent No.: US 9,550,924 B2
(45) Date of Patent: Jan. 24, 2017

(54) ACRYLIC PRESSURE SENSITIVE ADHESIVE AND SURFACE FINISHING MATERIAL COMPRISING THE SAME

(75) Inventors: Chan Bum Ko, Daejeon (KR); Young Min Kim, Daejeon (KR); Kong Ju Song, Daejeon (KR); Kum Hyoung Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 402 days.

(21) Appl. No.: 12/883,915

(22) Filed: Sep. 16, 2010

(65) Prior Publication Data

US 2012/0071053 A1 Mar. 22, 2012

(51) Int. Cl.
*B32B 7/12* (2006.01)
*C09J 133/08* (2006.01)
*C09J 133/10* (2006.01)

(52) U.S. Cl.
CPC ............ *C09J 133/08* (2013.01); *C09J 133/10* (2013.01); *Y10T 428/264* (2015.01); *Y10T 428/2804* (2015.01); *Y10T 428/2848* (2015.01); *Y10T 428/2887* (2015.01); *Y10T 442/2754* (2015.04)

(58) Field of Classification Search
None
See application file for complete search history.

(56) References Cited

U.S. PATENT DOCUMENTS

| | | | |
|---|---|---|---|
| 3,492,260 A * | 1/1970 | Satas Donatas et al. | 524/555 |
| 3,922,464 A * | 11/1975 | Silver | C09J 7/045 427/208 |
| 3,971,766 A * | 7/1976 | Ono | C08F 220/18 128/849 |
| 3,983,297 A * | 9/1976 | Ono et al. | 428/355 AC |
| 4,925,908 A * | 5/1990 | Bernard et al. | 526/320 |
| 5,130,375 A * | 7/1992 | Bernard et al. | 525/278 |
| 5,221,706 A * | 6/1993 | Lee et al. | 524/156 |
| 5,648,425 A * | 7/1997 | Everaerts et al. | 525/100 |
| 6,103,316 A * | 8/2000 | Tran | C08F 290/044 427/208.4 |
| 6,582,789 B1* | 6/2003 | Sumi | 428/40.1 |
| 2007/0218276 A1* | 9/2007 | Hiramatsu | C09J 7/0217 428/354 |
| 2010/0048077 A1* | 2/2010 | Ko et al. | 442/151 |
| 2011/0014465 A1* | 1/2011 | Song et al. | 428/354 |

OTHER PUBLICATIONS

Donatas, Satas (editor), "Handbook of Pressure Sensitive Adhesive Technology", 1999, Satas & Associates, third edition, pp. 444-451.*
Kobayashi, Hiromasa et al., "Pressure Sensitive Adhesive Composition and Pressure Sensitive Adhesive Sheet", machine translation of JP 2005-008830A, Jan. 13, 2005.*
Hiromasa, Kobayashi, English translation of JP 2005-008830A, published on Jan. 13, 2005.*

* cited by examiner

*Primary Examiner* — Anish Desai
(74) *Attorney, Agent, or Firm* — Dentons US LLP

(57) ABSTRACT

Acrylic pressure-sensitive adhesive including an acrylic copolymer formed by copolymerizing: i) 81 to 96% by weight of an alkyl (meth) acrylic acid ester monomer having a carbon number of an alkyl group of 2 to 14; ii) 1 to 10% by weight of at least one monomer selected from the group consisting of an allyl ester, a vinyl ester and an unsaturated acetate; iii) 1 to 10% by weight of an acrylonitrile monomer; and iv) 0.1 to 2% by weight of a crosslinker including 5 to 15 of an alkylene oxide group, and having two or more groups of an acrylate group, a vinyl group or the combination thereof, and a surface finishing material comprising the same, which is environmentally friendly, has an excellent room temperature and an aging adhesive property, and has an excellent constructability.

12 Claims, No Drawings

ACRYLIC PRESSURE SENSITIVE ADHESIVE AND SURFACE FINISHING MATERIAL COMPRISING THE SAME

TECHNICAL FIELD

The present invention relates to an acrylic pressure-sensitive adhesive and a surface finishing material comprising the same, and more specifically to an acrylic pressure-sensitive adhesive that is environmentally friendly, has excellent room temperature and aging adhesive properties, and has an excellent constructability when it is applied to the surface finishing material, and a surface finishing material comprising the same.

BACKGROUND OF THE INVENTION

Recently, the using of a surface finishing material in the form of sticker, such as an interior/exterior material, an interior design material, an advertisement material, and the like that are applied with an adhesive, is being largely increased.

As the adhesive, an oil adhesive has superior adhesive strength, but has the problem that a large quantity of a harmful materials for the environment and human are emitted by including an organic solvent, and an aqueous adhesive (or aqueous emulsion adhesive) has an advantage that is environmentally friendly and doesn't emit the harmful material because it doesn't include the organic solvent and uses the water as a dispersion medium, and doesn't have a transcription of the adhesive when removing it after use, however has a disadvantage that the adhesion is a little bit decreased compared to the oil adhesive, particularly the adhesive property is largely deteriorated by aging.

Accordingly, a development of the aqueous adhesive, in which there is no deterioration of the adhesion, in particular adhesive property due to the aging, so that it is environmentally friendly and harmless to human, and the surface finishing material including the same are urgent.

SUMMARY OF THE INVENTION

To solve the above-mentioned problems, an object of the present invention is to provide an acrylic pressure-sensitive adhesive that is environmentally friendly, has an excellent room temperature and aging adhesive properties, and has an excellent constructability when it is applied to the surface finishing material, and a surface finishing material comprising the same.

The object and other objects of the present invention can be achieved by the following description of the present invention.

To achieve the object, the present invention provides an acrylic pressure-sensitive adhesive that is achieved by including an acrylic copolymer being formed by copolymerizing: i) 81 to 96% by weight of an alkyl (meth) acrylic acid ester monomer having a carbon number of an alkyl group of 2 to 14; ii) 1 to 10% by weight of at least one monomer selected from the group consisting of an allyl ester, a vinyl ester and an unsaturated acetate; iii) 1 to 10% by weight of an acrylonitrile monomer; and iv) 0.1 to 2% by weight of a crosslinker including the alkylene oxide groups of 5 to 15, and having two or more groups of an acrylate group, a vinyl group or the combination thereof, and a surface finishing material comprising the same.

DETAILED DESCRIPTION

An aging adhesive property being described in the detailed description of the present invention means the adhesive property after a lapse of long time at high temperature.

Hereinafter, an exemplary embodiment of the present invention will be described in detail.

An acrylic pressure-sensitive adhesive of the present invention is characterized in that is achieved by including an acrylic copolymer formed by copolymerizing: i) 81 to 96% by weight of an alkyl (meth) acrylic acid ester monomer having a carbon number of an alkyl group of 2 to 14; ii) 1 to 10% by weight of at least one monomer selected from the group consisting of an allyl ester, a vinyl ester and an unsaturated acetate; iii) 1 to 10% by weight of an acrylonitrile monomer; and iv) 0.1 to 2% by weight of a crosslinker including the alkylene oxide groups of 5 to 15, and having two or more groups of an acrylate group, a vinyl group or the combination thereof.

The i) alkyl (meth)acrylic acid ester monomer having a carbon number of an alkyl group of 2 to 14 is preferably at least one selected from the group consisting of ethyl (meth) acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth) acrylate, n-octyl (meth)acrylate, isooctyl (meth)acrylate, isononyl (meth)acrylate, lauryl (meth)acrylate, and tetradecyl (meth)acrylate, and the like.

The i) alkyl (meth) acrylic acid ester monomer having a carbon number of an alkyl group of 2 to 14 preferably includes 81 to 96% by weight based on total 100% by weight of the monomer of i) to iv), there are the problems that, in case of less than 81% by weight, the initial adhesion of the produced acrylic pressure-sensitive adhesive is insufficient, in case of over than 96% by weight, the transcription of the adhesive to the adherent when it is removed after using is largely occurred.

The alkyl group of the i) has preferably the carbon number of 2 to 14, there are the problems that, in case of less than 2, a glass transition temperature of the produced acrylic pressure-sensitive adhesive is so high that the cohesion is decreased, in case of over than 14, the produced acrylic pressure-sensitive adhesive become so flexible that the adhesive property is deteriorated.

The ii) at least one monomer selected from the group consisting of an allyl ester, a vinyl ester and unsaturated acetate is preferably vinyl acetate, the iii) an acrylonitrile monomer is preferably an acrylonitrile.

The monomer of the ii) and iii) preferably includes 1 to 10% by weight respectively, based on total 100% by weight of the monomer of the i) to iv), there are the problems that, in case of less than 1% by weight, the produced acrylic copolymer become so flexible that sufficient adhesive property could not be secured, in case of over than 10% by weight, the acrylic copolymer become excessively solid so that the remarkable deterioration of the adhesion is occur.

By using together the monomer of the ii) and iii), the room temperature adhesion is enhanced, as well as the synergy effect in the enhancement of the aging adhesive property is generated.

The iv) crosslinker including 5 to 15 of an alkylene oxide group, and having two or more groups of an acrylate group, a vinyl group or the combination thereof, is at least one selected from the group consisting of a polyethylene glycol diacrylate (PEGDA), a polypropylene glycol diacrylate (PPGDA), a 1,6-hexanediol ethoxylate diacrylate, a 1,6- hexanediol propoxylate diacrylate, a neopentyl glycol ethoxylate diacrylate, a neopentyl glycol propoxylate diacrylate, a trimethyl propane ethoxylate triacrylate, a trimethyl propane propoxylate triacrylate, a pentaerythritol ethoxylate triacrylate, a pentaerythritol propoxylate triacrylate, and the like, as concrete examples.

The crosslinker of iv) is characterized in that the chain length including 5 to 15 of alkylene oxide groups is long, there are problems that in case that the alkylene oxide group is less than 5, the produced acrylic pressure-sensitive adhesive is so solid more than need, so that the initial adhesion is decreased; but in case of over than 15, the produced acrylic pressure-sensitive adhesive is so flexible that the adhesive property is deteriorated.

The content of the gel of the acrylic copolymer is preferably 40 to 80%, and more preferably 50 to 70%. Within this range, there are the effects that the inner cohesion strength is excellent so that the adhesive retention with the adherent is enhanced, in the view of the adhesive property, the adhesion is excellent due to sufficient flexibility being provided, and even there is no transcription of the adhesive to the adherent after using, it is removable.

The acrylic copolymer may be copolymerized by further including a tackifier when preparing in order to enhance the adhesion.

The tackifier may be added in 5 to 10 parts by weight based on the total 100 parts by weight of the monomer of the i) to iv), in case of the tackifier that is usually applied to the acrylic copolymer, for example, at least one selected from the group consisting of a (hydro) hydrocarbon resin, a (hydro) rosin resin, a (hydro) rosin ester resin, a (hydro) terpene resin, a (hydro) terpene phenol resin, a polymerized rosin resin, a polymerized rosin ester resin, and the like as concrete examples, but it is not limited thereto.

The copolymerization method is not specifically limited, but is preferably by an emulsion polymerization, in which a heat of reaction is easily controlled.

The polymerization initiator being used in the emulsion polymerization may be an aqueous polymerization initiator such as persulfate of an ammonium or alkali metal; or a hydrogen peroxide, and the like, in case that the solvent is water, and is preferably used in 0.2 to 2 parts by weight based on the total 100 parts by weight of the monomer of the i) to iv).

A surfactant being used in the emulsion polymerization may be an anionic surfactant, a nonionic surfactant or a mixture thereof, and preferably the mixture of an anionic and a nonionic surfactant. In case that the mixed surfactant is used, the polymerization reaction is stably proceeding, so it has an effect that the storage stability of the product is excellent after polymerization.

The above-mentioned surfactant has a role of the production of the initial particle in the polymerization reaction, the size control of the produced particle, the enhancement of the stability of the particle, and the like, and may be at least one selected from the group consisting of, for example, an alkyl diphenyl oxide disulfonate, a sodium polyoxyethylene alkyl ether sulfate, a polyethylene oxide alkylaryl ether, and the like.

The surfactant is preferably used in 0.5 to 2 parts by weight based on the total 100 parts by weight of the monomer of the i) to iv).

The reaction temperature of the emulsion polymerization may be selected from the range of 0 to 100° C., and preferably 50 to 80° C., the acrylic copolymer being produced within this range has an excellent adhesive property.

An acrylic copolymer being produced by emulsion polymerization may be used as the acrylic pressure-sensitive adhesive or the main component of the acrylic pressure-sensitive adhesive, in the emulsion condition directly after polymerization as it is, and may be used as the acrylic pressure-sensitive adhesive or the main component of the acrylic pressure-sensitive adhesive by neutralizing it to the alkali material directly after polymerization as necessary.

The alkali material may be an inorganic compound such as a hydroxide, a chloride, a carbonate, and the like of monovalent or divalent metal; ammonia; or an organic amine; and the like.

The acrylic pressure-sensitive adhesive is comprised by including the acrylic polymer, and may further include at least one selected from the group consisting of an ultraviolet stabilizer, an antioxidant, a colorant, an adjuvant, a filler, a defoamer, a surfactant, a plasticizer, and the like.

The surface finishing material of the present invention is characterized in that is comprised by including a substrate layer; and an adhesive layer that is formed on the one side or both side of the substrate layer, and contains the acrylic pressure-sensitive adhesive.

The substrate layer may be for example, a polymer resin, a wood, leather, a fabric or metal, and the like, but it is not limited thereto.

The one side of the adhesive layer has a thickness of preferably 20 to 30 µm, within this range, the dry time isn't long simultaneously with sufficient adhesive property being secured, so that is economically feasible.

The forming of the adhesive layer on the one side or both sides of the substrate layer includes directly applying and drying the acrylic pressure-sensitive adhesive on the surface of the substrate layer by using a bar coder, and the like, or applying and drying the acrylic pressure-sensitive adhesive to the detachable substrate (a release film) surface and then transcribing the adhesive layer being formed on the surface of the detachable substrate to the substrate layer the to produce the adhesive product specimen having a consistent adhesive thickness, and the like, as concrete examples, but it is not limited thereto.

The surface finishing material is not limited specially to use, but is used as for example, a building inner/exterior material, an interior material, an advertisement material, and the like, and has a excellent detachability and adhesion to the adherent of various quality of the material of a plywood, a plaster board, an asbestos straight, and the like.

Hereinafter, the present invention will be described in more detail with reference to the following preferable Examples, but the Examples are illustrated and intended to cover various changes and modifications included within the spirit and scope of the present invention, it is natural that these changes and modifications are belong to the appended claims.

EXAMPLE

Example 1

To a 2 L glass reactor equipped with a thermometer, a stirrer, a dropping funnel, a nitrogen inlet tube, and a reflux cooler, 30 parts by weight of water and 0.5 parts by weight of an alkyl diphenyl oxide disulphonate that is an anionic surfactant were added. The inner of the reaction vessel was substituted with nitrogen while stirring, and then the temperature of the reaction vessel is increased up to 70° C. under the nitrogen atmosphere.

After 0.2 parts by weight of an ammonium persulfate was added to the reactor and was dissolved completely, a monomer mixture solution being emulsified by mixing a solution containing 59.5 parts by weight of a butylacrylate, 26 parts by weight of a 2-ethylhexylacrylate, 7 parts by weight of a vinyl acetate, 7 parts by weight of an acrylonitrile, and 0.5 parts by weight of a polyethylene glycol diacrylate (5 moles of an ethyleneoxide average adding mole number) as a crosslinker; and a solution containing 1.0 parts by weight of an alkyldiphenyloxide disulphonate that is an anionic surfactant, and 50 parts by weight of water, and 15 parts by weight of an aqueous ammonium persulfate solution with 7% by weight concentration were dropped for 4 hours. After the dropping was finished, 5 parts by weight of an aqueous ammonium persulfate solution with 3% by weight concentration was again added at a time, then was maintained at 80° C. for 1 hour, to complete the polymerization reaction, and was cooled to the room temperature, to yield an acrylic copolymer.

Example 2

Except using 0.5 parts by weight of polyethylene glycol diacrylate (9 moles of ethyleneoxide average adding mole number) as a crosslinker among a monomer mixture solution in the example 1, the same method as example 1 was carried out.

Example 3

Except using 0.5 parts by weight of polyethylene glycol diacrylate (15 moles of ethyleneoxide average adding mole number) as a crosslinker among a monomer mixture solution in the example 1, the same method as example 1 was carried out.

Example 4

Except using 0.5 parts by weight of polypropylene glycol diacrylate (5 moles of propyleneoxide average adding mole number) as a crosslinker among a monomer mixture solution in the example 1, the same method as example 1 was carried out.

Example 5

Except using 0.5 parts by weight of polypropylene glycol diacrylate (8 moles of propyleneoxide average adding mole number) as a crosslinker among a monomer mixture solution in the example 1, the same method as example 1 was carried out.

Example 6

Except using 0.5 parts by weight of polypropylene glycol diacrylate (13 moles of propyleneoxide average adding mole number) as a crosslinker among a monomer mixture solution in the example 1, the same method as example 1 was carried out.

Comparative Example 1

Except using 0.5 parts by weight of polyethylene glycol diacrylate (4 moles of ethyleneoxide average adding mole number) as a crosslinker among a monomer mixture solution in the example 1, the same method as example 1 was carried out.

Comparative Example 2

Except using 0.5 parts by weight of polypropylene glycol diacrylate (3 moles of propyleneoxide average adding mole number) as a crosslinker among a monomer mixture solution in the example 1, the same method as example 1 was carried out.

Comparative Example 3

Except using 53.5 parts by weight of butylacrylate, 22 parts by weight of 2-ethylhexylacrylate, 12 parts by weight of vinyl acetate, 12 parts by weight of acrylonitrile and 0.5 parts by weight of polyethylene glycol diacrylate (5 moles of ethyleneoxide average adding mole number) as a crosslinker among a monomer mixture solution in the example 1, the same method as example 1 was carried out.

The types and contents of the crosslinker being used in the Examples 1 to 6 and the Comparative Examples 1 to 3, and the gel content of the acrylic copolymer being prepared were shown in the following Table 1.

TABLE 1

| | Crosslinker | | | | |
|---|---|---|---|---|---|
| Division | Types | Contents (Parts by Weight) | The number of EO group (adding mole number) | The number of PO group (adding mole number) | Gel contents (%) |
| Example 1 | PEGDA | 0.5 | 5 | | 59 |
| Example 2 | PEGDA | 0.5 | 9 | | 61 |
| Example 3 | PEGDA | 0.5 | 15 | | 61 |
| Example 4 | PPGDA | 0.5 | | 5 | 60 |
| Example 5 | PPGDA | 0.5 | | 8 | 62 |
| Example 6 | PPGDA | 0.5 | | 13 | 61 |
| Comparative Example 1 | PEGDA | 0.5 | 4 | | 60 |
| Comparative Example 2 | PPGDA | 0.5 | | 3 | 60 |
| Comparative Example 3 | PEGDA | 0.5 | 5 | | 61 |

*PO group: Propylene Oxide group
*EO group: Ethylene Oxide group

Experimental Example

After the acrylic copolymer prepared in the examples 1 to 6 and comparative examples 1 to 3 were applied to the release film by using the method for coating, respectively, and dried, these are laminated to the one side of the polyvinyl chloride resin (PVC) sheet to yield the surface finishing material specimen having 25 μm of thickness of an acrylic pressure-sensitive adhesive layer. The adhesion for the prepared surface finishing material specimen was evaluated by the following method, and the results were disclosed in the following Table 2.

1) Room Temperature Adhesion: The surface finishing material specimen (1 inch*12 cm) being removed the release film was attached to the adherent at room temperature, the after 1 day, room temperature adhesion was measured on the basis of JIS Z 0237.

2) Aging Adhesion: The surface finishing material specimen (1 inch*12 cm) was stored under 70° C. for 3 days, then the release film was removed and attached to the adherent, the after 1 day, aging adhesion was measured on the basis of JIS Z 0237.

TABLE 2

| Division | Room Temperature Adhesion (gf/in) | Aging Adhesion (gf/in) |
| --- | --- | --- |
| Example 1 | 1090 | 800 |
| Example 2 | 1280 | 1060 |
| Example 3 | 1220 | 1080 |
| Example 4 | 1060 | 780 |
| Example 5 | 1290 | 1050 |
| Example 6 | 1200 | 1040 |
| Comparative Example 1 | 970 | 630 |
| Comparative Example 2 | 950 | 640 |
| Comparative Example 3 | 980 | 680 |

As shown in the table 2, the surface finishing material of the present invention (Examples 1 to 6) containing an acrylic pressure-sensitive adhesive that is crosslinked with a long chain and has 40% to 80% of the gel contents, have excellent room temperature adhesion and aging adhesion, compared with the surface finishing material (Comparative Examples 1 and 2) containing an acrylic pressure-sensitive adhesive that is crosslinked with a short chain and has 40% to 80% of the gel contents, and the surface finishing material (Comparative Example 3) containing less than 81% by weight (75.5% by weight) of an alkyl (meth)acrylic acid ester monomer.

From the description, it was assumed that, in case that the chain length is short within the range having same gel contents, the acrylic pressure-sensitive adhesive become more solid to decrease the room temperature and aging adhesion, but in case that the chain length is long, the acrylic pressure-sensitive adhesive become more flexible to increase the room temperature and aging adhesion.

As described above, there is an effect to provide an acrylic pressure-sensitive adhesive that is environmentally friendly as an aqueous adhesive, has excellent room temperature and aging adhesive properties, and has an excellent constructability when it is applied to the surface finishing material, and a surface finishing material comprising the same, according to the present invention.

What is claimed is:

1. An acrylic pressure-sensitive adhesive, comprising an acrylic copolymer formed by an emulsion copolymerization of:
   i) 81 to 96% by weight of an alkyl (meth) acrylic acid ester monomer having an alkyl group with a carbon number of 4 to 14;
   ii) 1 to 10% by weight of vinyl acetate;
   iii) 1 to 10% by weight of an acrylonitrile monomer;
   iv) 0.1 to 2% by weight of a crosslinker including 15 moles of an alkylene oxide group, and having two or more groups of an acrylate group, a vinyl group or a combination thereof;
   v) 0.5 to 2 parts by weight of alkyl diphenyl oxide disulfonate as an anionic surfactant based on total 100 parts by weight of components i)-iv); and
   vi) 0.2 to 2 parts by weight of an ammonium persulfate as an aqueous polymerization initiator, based on total 100 parts by weight of components i)-iv),
   wherein the acrylic copolymer has a gel content of 50% by weight to 70% by weight, and
   wherein the acrylic pressure-sensitive adhesive is an aqueous emulsion adhesive.

2. The acrylic pressure-sensitive adhesive of claim 1, wherein the monomer of the i) is at least one selected from the group consisting of n-butyl (meth)acrylate, t-butyl (meth)acrylate, sec-butyl (meth)acrylate, pentyl (meth)acrylate, 2-ethylhexyl (meth)acrylate, n-octyl (meth)acrylate, isooctyl (meth)acrylate, isononyl (meth)acrylate, lauryl (meth)acrylate, and tetradecyl (meth)acrylate.

3. The acrylic pressure-sensitive adhesive of claim 1, wherein the crosslinker of the iv) is at least one selected from the group consisting of polyethylene glycol diacrylate and polypropylene glycol diacrylate.

4. The acrylic pressure-sensitive adhesive of claim 1, further comprising a tackifier.

5. The acrylic pressure-sensitive adhesive of claim 1, wherein the acrylic pressure-sensitive adhesive further comprises at least one selected from the group consisting of an ultraviolet stabilizer, an antioxidant, a colorant, an adjuvant, a filler, a defoamer, a surfactant, and a plasticizer.

6. A surface finishing material comprising:
   a substrate layer; and
   an adhesive layer that is formed on a one side or both sides of the substrate layer, and contains the acrylic pressure-sensitive adhesive of claim 1.

7. The surface finishing material of claim 6, wherein the substrate layer is a polymer resin, a wood, leather, a fabric, or a metal.

8. The surface finishing material of claim 6, wherein the adhesive layer has a thickness of 20 to 30 μm.

9. A surface finishing material comprising:
   a substrate layer; and
   an adhesive layer that is formed on a one side or both sides of the substrate layer, and contains the acrylic pressure-sensitive adhesive of claim 2.

10. A surface finishing material comprising:
    a substrate layer; and
    an adhesive layer that is formed on a one side or both sides of the substrate layer, and contains the acrylic pressure-sensitive adhesive of claim 3.

11. A surface finishing material comprising:
    a substrate layer; and
    an adhesive layer that is formed on a one side or both sides of the substrate layer, and contains the acrylic pressure-sensitive adhesive of claim 4.

12. A surface finishing material comprising:
    a substrate layer; and
    an adhesive layer that is formed on a one side or both sides of the substrate layer, and contains the acrylic pressure-sensitive adhesive of claim 5.

* * * * *